March 18, 1924.
T. J. McCARTHY
1,487,584
AUTO TRUCK OR DOLLY
Filed April 15, 1922
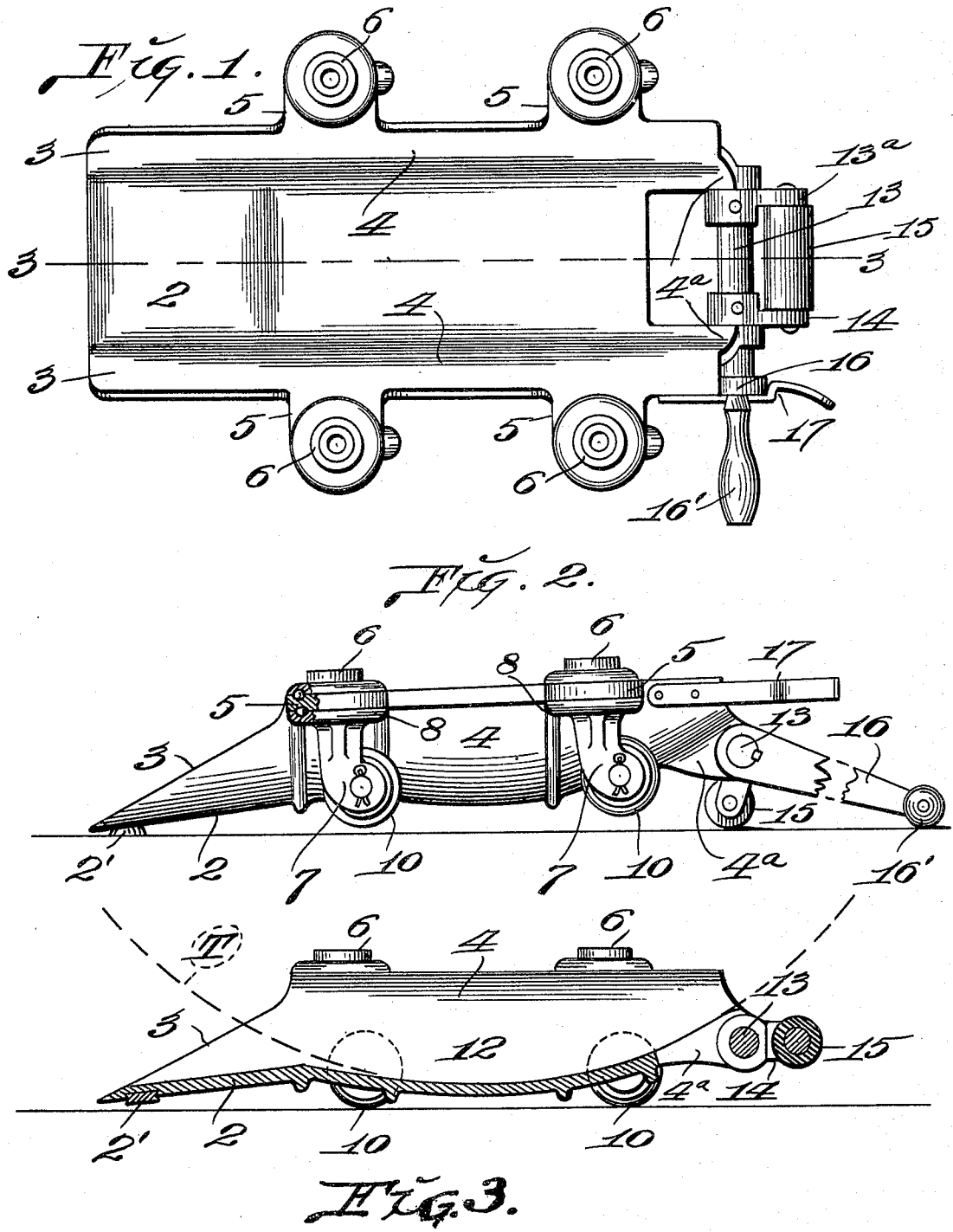

Patented Mar. 18, 1924.

1,487,584

UNITED STATES PATENT OFFICE.

THOMAS J. McCARTHY, OF LOS ANGELES, CALIFORNIA.

AUTO TRUCK OR DOLLY.

Application filed April 15, 1922. Serial No. 553,181.

*To all whom it may concern:*

Be it known that I, THOMAS J. MC-CARTHY, a citizen of the United States, residing at Los Angeles, in the county of Los Angeles and State of California, have invented new and useful Improvements in Auto Trucks or Dollies, of which the following is a specification.

This invention relates to means for facilitating the shifting of heavy vehicles such as automobiles and has for its object to provide an improved truck or dolly of a construction and size capable of its being readily positioned contiguous to a wheel of an automobile.

A further object is to provide for the running of the automobile onto a set of the dollies when they are arranged in proper position with respect to the wheels of the automobile. Another object is to provide a dolly of simple and substantial construction and which may be readily adjusted and locked in a wheel receiving position and then lowered and thereby permit the vehicle to be easily turned and shifted from place to place.

An embodiment of the invention is described in the following specification and is illustrated in the accompanying drawings, in which—

Fig. 1 is a plan of a preferred form of the dolly showing the elevating cam in the inoperative position.

Fig. 2 is a side elevation showing the dolly with the cam in the elevating position.

Fig. 3 is a longitudinal section on line 3—3 of Fig. 1.

There is shown in my Patent No. 1,419,067, June 6, 1922, a form of dolly, and the present invention pertains to improvements in that device.

The present dolly consists of a substantial integral body having at one end an entrance runway 2 having at its sides upwardly inclined flanges 3 which merge into substantially vertical side walls 4 which are provided with outwardly extending horizontally arranged lugs or ears 5—5. The lugs or ears are arranged, preferably, in one common plane and receive heads 6 of the shanks of casters 7 having collars 8. Above the tops and bottoms of the several bearing ears 5 are provided sets of ball bearings to provide for the easy shifting of the dolly when the caster wheels 10 thereof are all bearing on the supporting surface. The entrance runway 2 inclines downwardly and forwardly, as clearly shown in Figs. 2 and 3, with respect to the plane of the ears 5, and the rear upper end of the runway leads into a concavo-convex seat 12 between the side walls 4 of the device so that when a vehicle wheel, the tire of which is indicated at T in dotted lines, runs up the runway, it then passes into the concave seats 12 of a set of dollies and these are therefore firmly positioned beneath the wheels of the vehicle so that the latter can be shifted and turned with rapidity and ease universally on a horizontal plane.

The running of the vehicle onto the dollies, when these have been positioned against the wheel tires, is facilitated by tilting the entrance runway 2 down close to the supporting plane and in under the adjacent tire, and the tilting of the dolly is effected by a suitable device of which a preferred form consists of a crank shaft 13 which is journaled in rearwardly extending lugs 4$^a$ at the ends of the side walls 4. Between the adjacent faces of the bearing lugs 4$^a$ are provided short levers or cranks 14 which are pinned or otherwise fastened on the crank shaft 13, and the outer ends of the levers are shown as recessed at 13$^a$ to receive the contiguous ends of a cam cylinder 15, which is thus disposed in the longitudinal center line or axis of the dolly body.

One end of the crank shaft 13 is provided with a manual handle arm 16 which is disposed at a right angle to the radius line of the crank lever 14. The handle in its normal position extends vertically up and is thus latched by a spring hook or other device 17 fastened to the bottom of the dolly. After the dolly has been positioned against the bottom of the tire of a wheel, the operator then disengages the hand lever 16 from the latch 17 and throws the hand lever outwardly and downwardly, thus swinging the crank or cam 15, which may have a rubber face, down upon the supporting surface. Sufficient pressure being applied to the hand lever forces the crank 15 slightly forward of the vertical plane passing along the axis of the crank shaft 13 and the hand grip 16' at the end of the hand lever is, preferably, thrown into engagement with the supporting surface as the floor indicated in Fig. 2. This gives a three point support for the dolly: One at the front end of the entrance guideway 2 which may be provided with rubber pads 2'; one at the cam 15 beneath the end of the dolly body; and one at the outer end of the hand lever 16. The vehicle is then pushed back to roll up on the entrance guideways 2 and thence down onto the concave seats 12. The position of the cam 15 and the hand grip 16' with respect to the axis of the crank shaft, it will be seen, prevents the cam roller from springing out under the load imposed on the dolly.

After the vehicle has been run upon the dollies, the hand levers of the dollies are pulled up to throw the cam rollers 15 back out of the way and to lower the elevated ends of the dollies from the position in Fig. 2 to that shown in Fig. 3, and thereafter the vehicle can be readily rolled and shifted about.

Various modifications and changes may be resorted to within the spirit of the invention as claimed.

What is claimed is:

A dolly adapted to receive and support a wheel of a vehicle and being provided at one end with an entrance runway inclining downwardly at the front, a crank shaft journaled across the opposite end of the dolly and provided with crank arms extending rearwardly and provided with an intermediate crank or cam element adapted to be shifted down into dolly elevating position, the said pads and said element forming non-rolling supports to prevent the dolly rolling when the wheel is run onto the dolly.

In testimony whereof I have signed my name to this specification.

THOMAS J. McCARTHY.